(12) United States Patent
Licciardo

(10) Patent No.: US 6,173,675 B1
(45) Date of Patent: Jan. 16, 2001

(54) AROMATHERAPY MATS FOR PETS

(75) Inventor: Rochine Licciardo, Buchannon, WV (US)

(73) Assignee: International Marketing Corp., Westville, NJ (US)

(*) Notice: Under 35 U.S.C. 154(b), the term of this patent shall be extended for 0 days.

(21) Appl. No.: 09/190,818

(22) Filed: Nov. 12, 1998

(51) Int. Cl.⁷ .................................................. A01K 1/035
(52) U.S. Cl. ........................................................ 119/28.5
(58) Field of Search ................................. 119/28.5, 174

(56) References Cited

U.S. PATENT DOCUMENTS

| | | |
|---|---|---|
| 69,376 | 10/1867 | Walton . |
| 372,763 | 11/1887 | Poitevent . |
| 461,916 | 10/1891 | Waterhouse . |
| 904,287 | 11/1908 | Warham . |
| 1,265,926 | 5/1918 | Ludlam . |
| 1,569,710 | 1/1926 | Burt . |
| 2,029,608 | 2/1936 | Buchman . |
| 3,382,509 | 5/1968 | Lupke et al. . |
| 4,008,688 | 2/1977 | Nicholas . |
| 4,649,861 | 3/1987 | Elkins et al. . |
| 4,713,291 | 12/1987 | Sasaki et al. . |
| 4,763,604 | 8/1988 | Meekins . |
| 5,038,431 | 8/1991 | Burgin et al. . |
| 5,127,367 | 7/1992 | Starowitz, Jr. . |
| 5,232,769 * | 8/1993 | Yamato et al. .................... 428/240 |
| 5,233,787 | 8/1993 | Anderson . |
| 5,297,732 | 3/1994 | Hahn . |
| 5,299,335 | 4/1994 | Ivester et al. . |
| 5,320,066 | 6/1994 | Gunter . |
| 5,456,745 | 10/1995 | Roreger et al. . |
| 5,522,105 | 6/1996 | Fujiwara et al. . |
| 5,567,436 | 10/1996 | Udelle . |
| 5,653,196 | 8/1997 | Bartleson . |
| 5,662,065 * | 9/1997 | Bandimere et al. ................ 119/28.5 |
| 5,682,838 | 11/1997 | Reich . |
| 5,685,257 | 11/1997 | Feibus . |
| 5,706,535 | 1/1998 | Takashima . |
| 5,724,911 * | 3/1998 | McAlister ........................... 119/28.5 |
| 5,732,426 | 3/1998 | Furuya et al. . |

* cited by examiner

Primary Examiner—Thomas Price
(74) Attorney, Agent, or Firm—Liniak, Berenato, Longacre & White

(57) ABSTRACT

The invention is a mattress, mat or bed for animals comprising a soft and comfortable mat which-contains aromatherapy herbs having volatile components which aid and enhance certain behaviors in cats and dogs when laid upon. The mat is constructed with layers of soft fiber filling material and herbs are arranged between the layers and an outer cover of the mat. Preferably the filling material are of such a nature as to aid in the confinement and control of the herb material, while allowing for the full effect of the mixture of the herbs to be obtained. The scent and volatile effects of the herbs are able to emerge through the layers of the filling material and be inhaled by the pet to render the desired behavior.

9 Claims, 1 Drawing Sheet

AROMATHERAPY MATS FOR PETS

BACKGROUND OF THE INVENTION

The invention is related to aromatherapy for animals and more particularly to pet mats filled with aromatic herbs.

In the pet accessory industry several types of pet beds are available. Most commonly pet beds are designed simply for the comfort of a cat or a dog, although other beds or mats have deodorizing effects or insect repelling effects. These beds are stuffed with a variety of materials such as wood shavings, powdered insecticides, or other materials suitable to achieve the effects of deodorizing the pet bed or repelling fleas or ticks therefrom.

Unknown to pet beds are those which provide the benefits of aromatherapy which humans have come to enjoy and to use therapeutically. Catnip toys have been used to provide a cat with a naturally scented toy which has a appealing odor to a cat and promotes feline activity with the toy. However, until now, there has not been known any toy or pet bed which will calm a cat or a dog or alter specific behavior patterns.

Accordingly, it is an object of the invention to provide a pet bed or mat which when a cat or dog is laid upon, a specific behavior is achieved, such as calming, nurturing, loving, or a reduction in the animal's anxiety or fear.

It is another object of the invention to provide an aromatherapy mat for a feline which will appeal to all cats and will effect the cat to positively respond in a calm manner.

It is another object of the invention to provide an aromatherapy mat for a dog which will attract the dog to go to the mat in a certain location.

It is yet another object of the invention to provide a versatile aromatherapy mat for both dogs and cats which can be used for either dogs or cats and will serve as a relaxation mat for pets who tend to become aggressive.

It is a further object of the invention to provide a rejuvenating aromatherapy mat which can revitalize a pet.

SUMMARY OF THE INVENTION

The invention is a mattress, mat or bed for animals comprising a soft and comfortable mat which contains herbs having volatile components which aid and enhance certain behaviors in cats and dogs when laid upon. The mat is constructed with layers of soft fiber filling material and herbs are arranged between the layers and an outer cover of the mat. Preferably the filling material are of such a nature as to aid in the confinement and control of the herb material, while allowing for the full effect of the mixture of the herbs to be obtained.

The scent and volatile effects of the herbs are able to emerge through the layers of the filling material and be inhaled by the pet to render the desired behavior. An animal's keen sense of small interacts with the limbic system of the animal to provoke the desired results. Nature takes over and the pet will respond. The pet also never tires of the stimulus as it would a toy.

The invention features an aromatherapy mat for a pet having a filling material contained within the mat, and an outer layer of porous material covering filling material. Aromatherapy herbs are contained within the mat which emit an aroma which is inhalable by a pet. The aromatherapy herbs induce a certain behavior pattern on the pet by the inhalation of the aroma by the pet. The aroma is emitted from mixture of blended aromatic herbs which are specially formulated to obtain the certain behavior pattern in the pet.

The invention features an aromatherapy mat which appeals to cats and induces a calm behavior pattern in cats. The specially formulated herbal mixture contains Catnip, Valerian, and Wormwood.

The invention also features an aromatherapy mat which appeals to dogs and induces a calm behavior pattern in dogs. The specially formulated herbal mixture contains Anise, Peppermint and Catnip.

Another feature of the invention is an aromatherapy mat which induces a relaxed behavior pattern in cats and dogs and contains a specially formulated mixture containing Lavender flowers, Hops buds, Mugwort, Lemon Verbena and Lemon balm.

Yet another aspect of the invention is an aromatherapy mat which induces a rejuvenated behavior pattern in cats and dogs. This mat has a specially formulated mixture containing Rosemary, Chamomile, Lavender Flowers, Marjoram Leaves and Peppermint.

These and other features of the invention will become apparent to those skilled in the art when taken in connection with the following description and drawings.

DETAILED DESCRIPTION OF THE INVENTION

Figure 1:
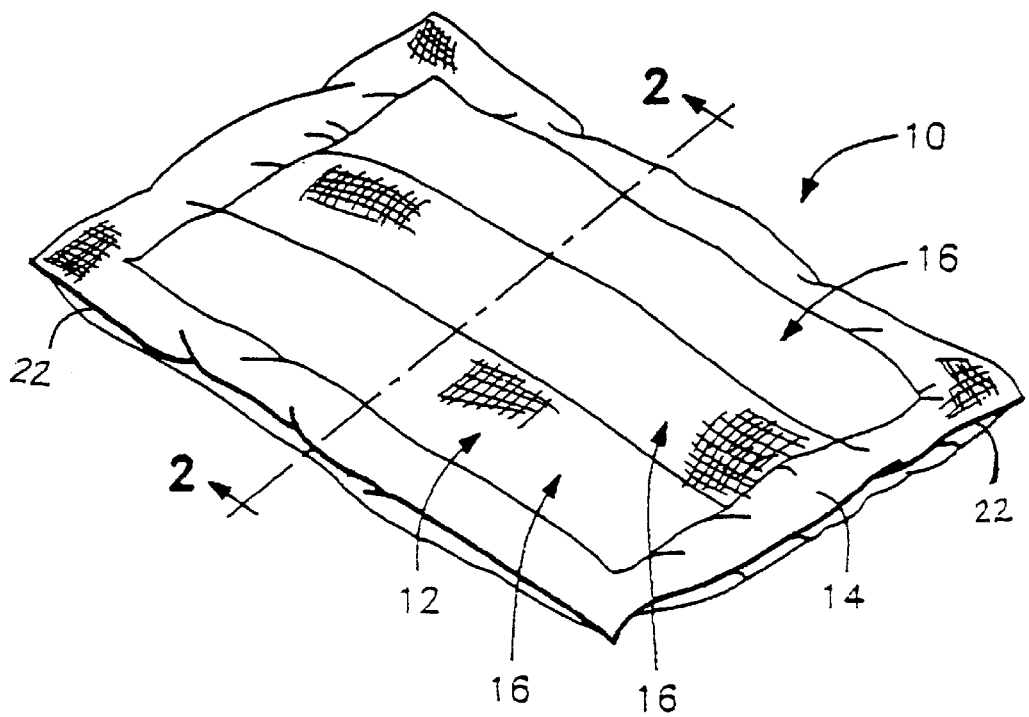
FIG. 1 is a perspective view of an aromatherapy mat of the present invention.
Figure 2:
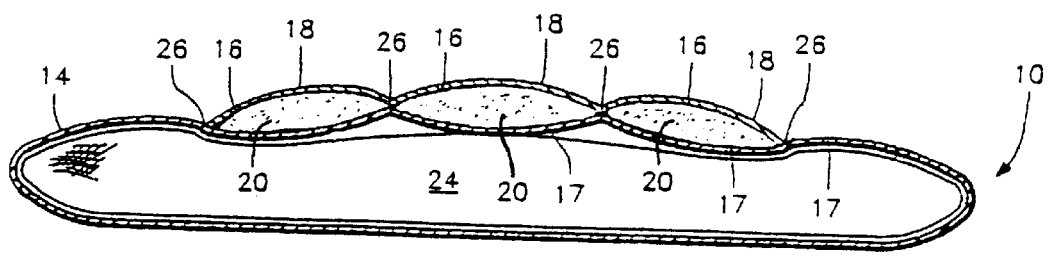
FIG. 2 is a cross sectional view taken along line II—II of FIG. 1.

Referring now to FIGS. 1 and 2, a pet mat embodying the teachings of the invention is generally designated as 10. The pet mat 10 has a generally rectangular shape having formed on its upper surface 12 thereof, three rectangular baffles 16 which have a lower layer of fabric 17, and an upper layer of fabric 18, and stitching 26 in between the upper and lower layers of fabric which form separate interior compartments 20 for the three baffles 16. The fabric material 14 is a soft porous material such as cotton. A continuous double layer of the lower and upper layers 17, 18 surround an interior portion of the mat which is stuffed with a soft filling material 24. The fabric is stitched together at various seams 22 to form the closed pet mat after the interior portion has been stuffed with the filling material 24 and the baffles 16 have been filled with a particular special blended formula of aromatic herbs according to the invention, as will be described hereinafter. Alternatively, a VELCRO closure can be used to enclose the pet mat along the seam or seams as desired, allowing for the pet mat to be refreshed by replacing herbs in the internal compartments.

It will be understood that the pillow-like pet mat 10 described is for illustrative purposes and that any type of pet mattress, pillow, or bed construction may be employed in connection with the present invention. For example, instead of the baffles shown in the illustrative example, a fluffy batting may be sewn to a top surface of any type of pet bed on which a pet would lay. The batting is impregnated and sprinkled with a special blend of herbs according to the invention. The batting acts as a grabber which holds the herbs in position. Then a soft porous outer cover is sewn on top of the batting to seal and complete the pet bed surface. Preferably the filling material is of such a nature as to aid in the confinement and control of the herb material, while allowing for the full effect of the mixture of the herbs to be obtained. The scent and volatile effects of the herbs are able to emerge through the layers of the filling material and be inhaled by the pet to render the desired behavior.

Another variation of the pet mat is a pillow having a construction as follows. A fluffy batt filling is sprinkled or impregnated with the desired mixture of blended herbs. An outer cover surrounds the filling. A VELCRO closure is provided on the outer cover so that the filling may be removed. The herbs can be shaken out from the filling and replaced with a fresh mixture, as desired. The outer cover can be washed and refilled with the fluffy batt filling containing the fresh mixture. It will be understood that any combination of the described constructions for pet mat can be modified or combined.

Several particular formulas of aromatic herbs for the aromatherapy mat for pets according to the invention will now be described in particular to the desired behavior pattern to be rendered upon a pet.

A first embodiment of the invention is an aromatherapy mat for cats. The cat mat has a special blended formula of Catnip, Valerian, and Wormwood. The catnip acts as a stimulant and euphoriant initially, and then as a depressant on felines. Although catnip may not appeal to all varieties of cats, the special blend of catnip with the Valerian and Wormwood appeals to virtually all cats. A cat will respond positively to the aroma of the blended formula, and will go to the mat.

A second embodiment of the invention is an aromatherapy mat for dogs. The dog mat has a special blended formula of Anise, Peppermint, and Catnip, which appeals to dogs and has the same effect on a dog as the cat mat does for a cat. These mats can be used to train a pet to go to a certain location or object, to keep a pet off of furniture, or to teach a cat the location of its litter box, for example.

A third embodiment of the invention is an aromatherapy mat for cats and dogs which has a relaxation effect on the cat or dogs behavior. The formula used in the relaxation mat includes herbal ingredients of Lavender flowers, Hops buds, and Lemon Balm, Lemon Verbena, and Mugwort. The relaxation mat is particularly useful for pets who dislike being transported, and who may become aggressive, fearful or frenzied. The relaxation mat can be placed in a pet carrier a few hours prior to transportation of the pet to a Veterinarian, Groomer, or Kennel. The pet will be relaxed after laying upon the mat, and will arrive at the appointment or destination in a calm, relaxed state, rather than in a frenzy. The relaxation mat is also very useful for long transportation in a pet carrier such as on planes, trains and automobiles. It relaxes even the most stubborn pets, while allowing a pet to travel in comfort.

The fourth embodiment of the invention is an aromatherapy mat for pet rejuvenation. The pet rejuvenation mat has a special herbal formula of Lavender flowers, Marjoram leaves, Chamomile, Rosemary and Peppermint which can help a pet become revitalized. This mat is particularly useful for pet who may be recuperating from an ailment. Some pets suffer from depression for a variety of reasons and the rejuvenation mat can be used rather than or in connection with pet psychiatry. This mat contributes to the well being of the animal's mental state, soothes both mental and physical aliments when the animal is sick or depressed, to help the animal heal faster.

While the invention has been described with references to various embodiments, the description is illustrative and is not to be construed as limiting the scope of the invention. Various modifications and changes may occur to those skilled in the art without departing from the spirit and scope of the invention as defined by the appended claims.

What is claimed is:

1. An aromatherapy mat for a pet comprising:

a filling material contained within said mat;

an outer layer of porous material covering said filling material;

aromatherapy means contained within said mat for emitting an aroma which is inhalable by a pet, said aromatherapy means for inducing a certain behavior pattern on the pet by the inhalation of said aroma by the pet, wherein said aroma is emitted from mixture of blended aromatic herbs which are specially formulated to obtain said certain behavior pattern in said pet, wherein said aromatherapy means appeals to cats and induces a claim behavior pattern in cats and wherein said mixture contains catnip and Valerian.

2. The aromatherapy mat according to claim 1, wherein said mixture also contains Wormwood.

3. An aromatherapy mat for a pet comprising a filling material contained within said mat;

an outer layer of porous material covering said filling material;

aromatherapy means contained within said mat for emitting an aroma which is inhalable by a pet, said aromatherapy means for inducing a certain behavior pattern on the pet by the inhalation of said aroma by the pet, wherein said aroma is emitted from mixture of blended aromatic herbs which are specially formulated to obtain said certain behavior pattern in said pet, wherein said aromatherapy means appeals to dogs and induces a calm behavior pattern in dogs and wherein said mixture contains Anise.

4. The aromatherapy mat according to claim 3, wherein said mixture also contains Catnip and Peppermint.

5. An aromatherapy mat for a pet comprising a filling material contained within said mat;

an outer layer of porous material covering said filling material;

aromatherapy means contained within said mat for emitting an aroma which is inhalable by a pet, said aromatherapy means for inducing a certain behavior pattern on the pet by the inhalation of said aroma by the pet, wherein said aroma is emitted from mixture of blended aromatic herbs which are specially formulated to obtain said certain behavior pattern in said pet, wherein said aromatherapy means induces a relaxed behavior pattern for cats and dogs and wherein said mixture contains Lavender flowers, Hops buds, and Lemon balm.

6. The aromatherapy mat according to claim 5, wherein said mixture also contains Lemon Verbena and Mugwort.

7. An aromatherapy mat for a pet comprising a filling material contained within said mat;

an outer layer of porous material covering said filling material;

aromatherapy means contained within said mat for emitting an aroma which is inhalable by a pet, said aromatherapy means for inducing a certain behavior pattern on the pet by the inhalation of said aroma by the pet, wherein said aroma is emitted from mixture of blended aromatic herbs which are specially formulated to obtain said certain behavior pattern in said pet, wherein said aromatherapy means induces a rejuvenated behavior pattern in cats and dogs, and wherein said mixture contains Rosemary, and Peppermint.

8. The aromatherapy mat according to claim 7, wherein said mixture also contains Chamomile, Lavender Flowers, and Marjoram.

9. An aromatherapy mat for a pet comprising a filling material contained within said mat;

an outer layer of porous material covering said filling material;

aromatherapy means contained within said mat for emitting an aroma which is inhalable by a pet, said aromatherapy means for inducing a certain behavior pattern on the pet by the inhalation of said aroma by the pet, wherein said aroma is emitted from mixture of blended aromatic herbs which are specially formulated to obtain said certain behavior pattern in said pet, wherein said outer layer has a releasable closure so that said filling material can be removed and refreshed with a fresh mixture of herbs, and said outer layer can be washed.

* * * * *